US010146655B2

(12) United States Patent
Dirscherl et al.

(10) Patent No.: US 10,146,655 B2
(45) Date of Patent: Dec. 4, 2018

(54) METHOD FOR DETERMINING AN INTERGRITY OF AN EXECUTION OF A CODE FRAGMENT AND A METHOD FOR PROVIDING AN ABSTRACTED REPRESENTATION OF A PROGRAM CODE

(71) Applicant: Infineon Technologies AG, Neubiberg (DE)

(72) Inventors: Gerd Dirscherl, Munich (DE); Marcel Schaible, Aschheim (DE); Michael Smola, Munich (DE); Bernhard Sommer, Gilching (DE)

(73) Assignee: Infineon Technologies AG, Neutiberg (DE)

( * ) Notice: Subject to any disclaimer, the term of this patent is extended or adjusted under 35 U.S.C. 154(b) by 98 days.

(21) Appl. No.: 15/214,045

(22) Filed: Jul. 19, 2016

(65) Prior Publication Data
US 2017/0024304 A1 Jan. 26, 2017

(30) Foreign Application Priority Data
Jul. 24, 2015 (DE) .................. 10 2015 112 143

(51) Int. Cl.
G06F 11/00 (2006.01)
G06F 11/28 (2006.01)

(52) U.S. Cl.
CPC .................... *G06F 11/28* (2013.01)

(58) Field of Classification Search
CPC ................ G06F 11/277; G06F 11/28
See application file for complete search history.

(56) References Cited

U.S. PATENT DOCUMENTS

| 5,862,150 | A | * | 1/1999 | Lavelle | G09G 5/395 345/530 |
| 5,974,529 | A | * | 10/1999 | Zumkehr | G06F 9/3005 712/239 |
| 7,788,314 | B2 | * | 8/2010 | Holt | G06F 15/16 709/201 |
| 7,788,318 | B2 | | 8/2010 | Kinoshita et al. | |

(Continued)

FOREIGN PATENT DOCUMENTS

| CN | 103369364 A | 10/2013 |
| CN | 104573502 A | 4/2015 |
| EP | 1316873 A2 | 6/2003 |

OTHER PUBLICATIONS

Ulrich Schoepp, Internship Compiler, WS 2014/2015, Institute for Theoretical Computer Science, LMU Muenchen, URL: https://www.tcs.ifi.lmu.de/lehre/ws-2014-15/compilerbau/material/folien, retrieved on Jun. 28, 2016, 370 pgs.

(Continued)

*Primary Examiner* — Joshua P Lottich
(74) *Attorney, Agent, or Firm* — Schiff Hardin LLP

(57) ABSTRACT

A method for determining an integrity of an execution of a code fragment is provided. The method includes identifying a reference signature for the code fragment within an abstracted representation of a program code comprising the code fragment. Further, the method includes executing the code fragment and determining a signature of the executed code fragment. The method includes comparing the signature with the reference signature.

23 Claims, 7 Drawing Sheets

(56) References Cited

U.S. PATENT DOCUMENTS

| | | | |
|---|---|---|---|
| 8,782,435 B1 * | 7/2014 | Ghose | G06F 9/3851 |
| | | | 711/118 |
| 9,762,399 B2 * | 9/2017 | Ghose | H04L 9/3247 |
| 2003/0101381 A1 | 5/2003 | Mateev et al. | |
| 2006/0156005 A1 | 7/2006 | Fischer et al. | |
| 2011/0191636 A1 * | 8/2011 | Genta | G06F 11/28 |
| | | | 714/37 |
| 2013/0007420 A1 * | 1/2013 | Van Assche | G06F 21/52 |
| | | | 712/220 |
| 2016/0119148 A1 * | 4/2016 | Ghose | G06F 9/3851 |
| | | | 713/176 |
| 2016/0371267 A1 * | 12/2016 | Narasimha | G06F 17/3033 |

OTHER PUBLICATIONS

German Patent Office, Office Action issued for DE 102015112143. 3, 7 pgs., dated Jun. 30, 2016.

Office Action dated Sep. 13, 2018 for Chinese Application No. 201610584873.0.

* cited by examiner

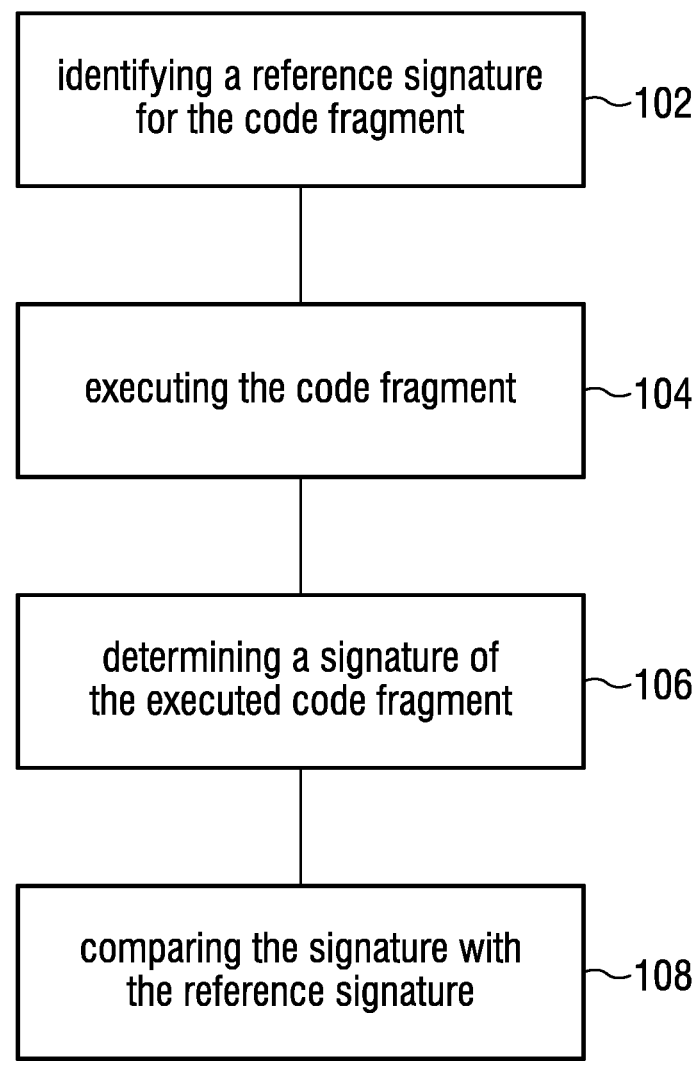

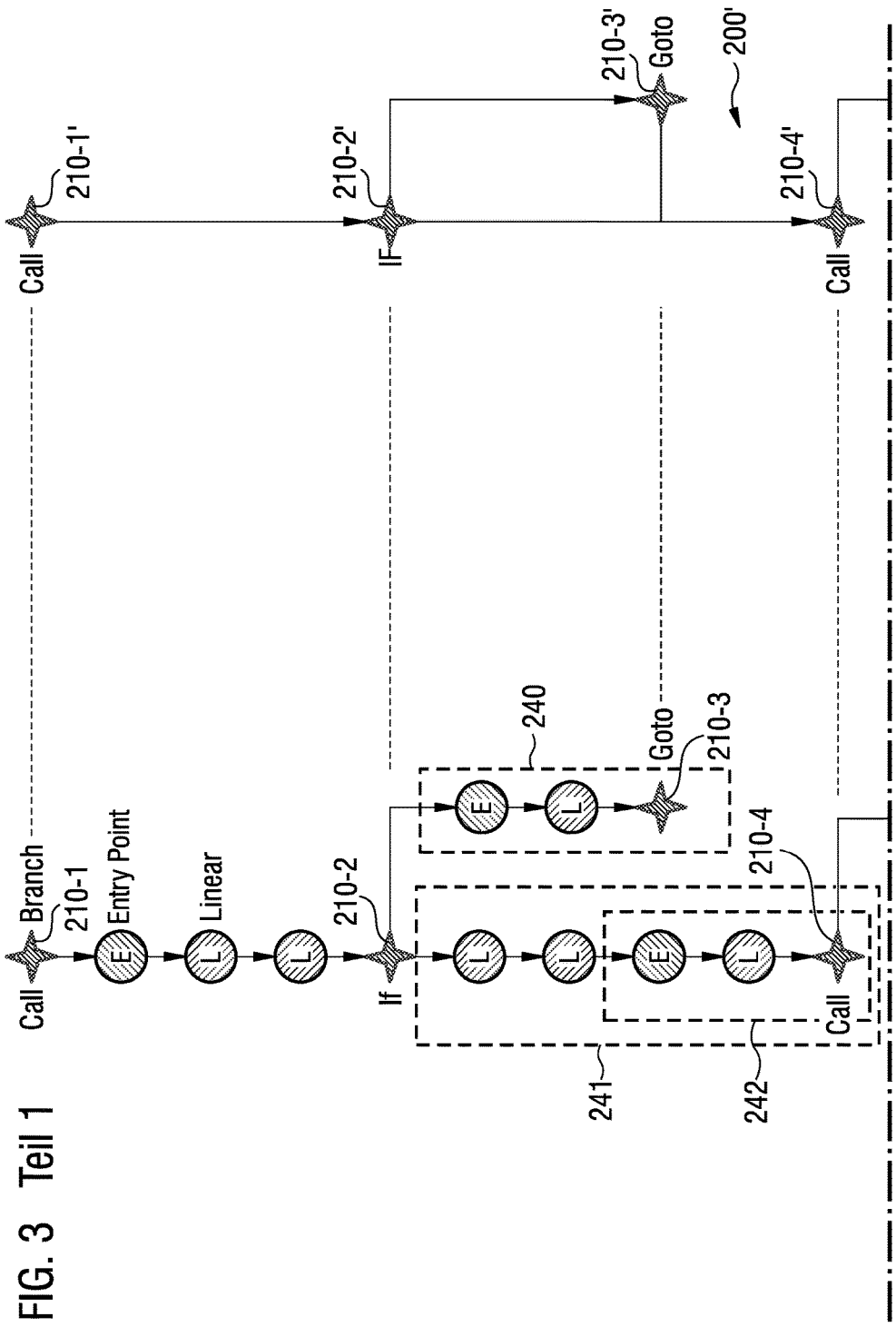
FIG. 3 Teil 1

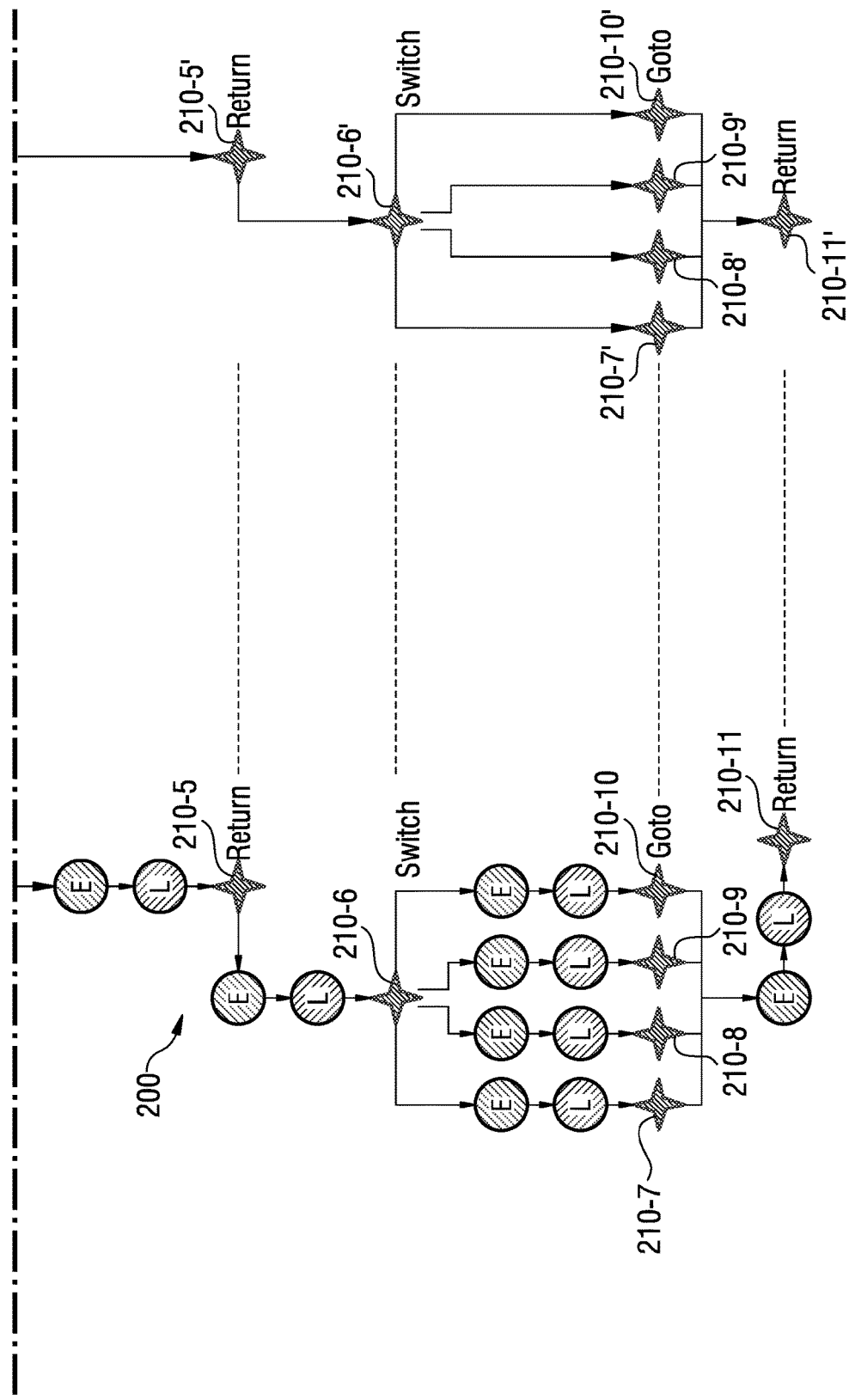
FIG. 3 Teil 2

METHOD FOR DETERMINING AN INTERGRITY OF AN EXECUTION OF A CODE FRAGMENT AND A METHOD FOR PROVIDING AN ABSTRACTED REPRESENTATION OF A PROGRAM CODE

FIELD

Embodiments relate to integrity determination. Some embodiments relate to a method for determining an integrity of an execution of a code fragment using an abstracted representation of a program code and further embodiments relate to a method for providing an abstracted representation of a program code.

BACKGROUND

The integrity of an execution of a code indicates that intended (i.e. correct) instructions within a fragment of the code are executed in an intended (i.e. correct) sequence. Moreover, the integrity of an execution of a code indicates that only intended (i.e. correct or valid) paths between fragments of the code are executed. In other words, the integrity indicates that an actual program flow of the executed code is identical to an intended program flow of the code. The execution of a code may be manipulated in many ways. For example, the execution may be manipulated physically by applying a defined amount of energy to a semiconductor circuit executing the code (integrity attack). For example, an electric or an electromagnetic pulse may be applied to the semiconductor circuit. Further, light pulses may be applied to the semiconductor circuit (e.g. by means of a laser). The energy input may cause a bit flip in the executed code, so that a course of the execution may be changed.

As a precaution, hardware executing the code may be provided such that external physical manipulation is detected. Furthermore, measures on software level may be taken to ensure code and data integrity. For example, code fragments having the same or a like functionality may be executed in parallel and the results may be compared, which requires the code of a software program to be programmed in a proprietary style. However, using such individual measures without an embedded security architecture may consume a lot of resources (e.g. in terms program development time, memory consumption or processing power to implement a function of similar output twice).

SUMMARY

While data integrity may be achieved with increased effort, there may be a demand for improved integrity determination for an execution of code. The demand may be satisfied by subject matter according to the enclosed claims.

Some embodiments relate to a method for determining an integrity of an execution of a code fragment. The method comprises identifying a reference signature for the code fragment within an abstracted representation of a program code comprising the code fragment. Further, the method comprises executing the code fragment and determining a signature of the executed code fragment. The method comprises comparing the signature with the reference signature.

Some embodiments relate to a method for providing an abstracted representation of a program code. The method comprises identifying a basic block. The basic block is a sequence of instructions that is entered only at the first instruction of the sequence of instructions and that can be exited only from the last instruction of the sequence of instructions. Further, the method comprises determining a reference signature for the basic block and determining a reference to a further basic block. The further basic block is the next sequence of instructions to be executed within the program code.

Some embodiments relate to a program execution engine which is configured to perform one of the methods.

Some embodiments relate to a chip card comprising the above program execution engine.

Some embodiments relate to a computer program having a program code configured to perform one of the methods, when the computer program is executed on a computer or processor.

BRIEF DESCRIPTION OF THE FIGURES

Some embodiments of apparatuses and/or methods will be described in the following by way of example only, and with reference to the accompanying figures, in which FIG. 1 illustrates a flowchart of a method for determining an integrity of an execution of a code fragment;

FIG. 3 illustrates a comparison between the graphs illustrated in FIG. 2a and FIG. 2b;

DETAILED DESCRIPTION

Figure 2A:
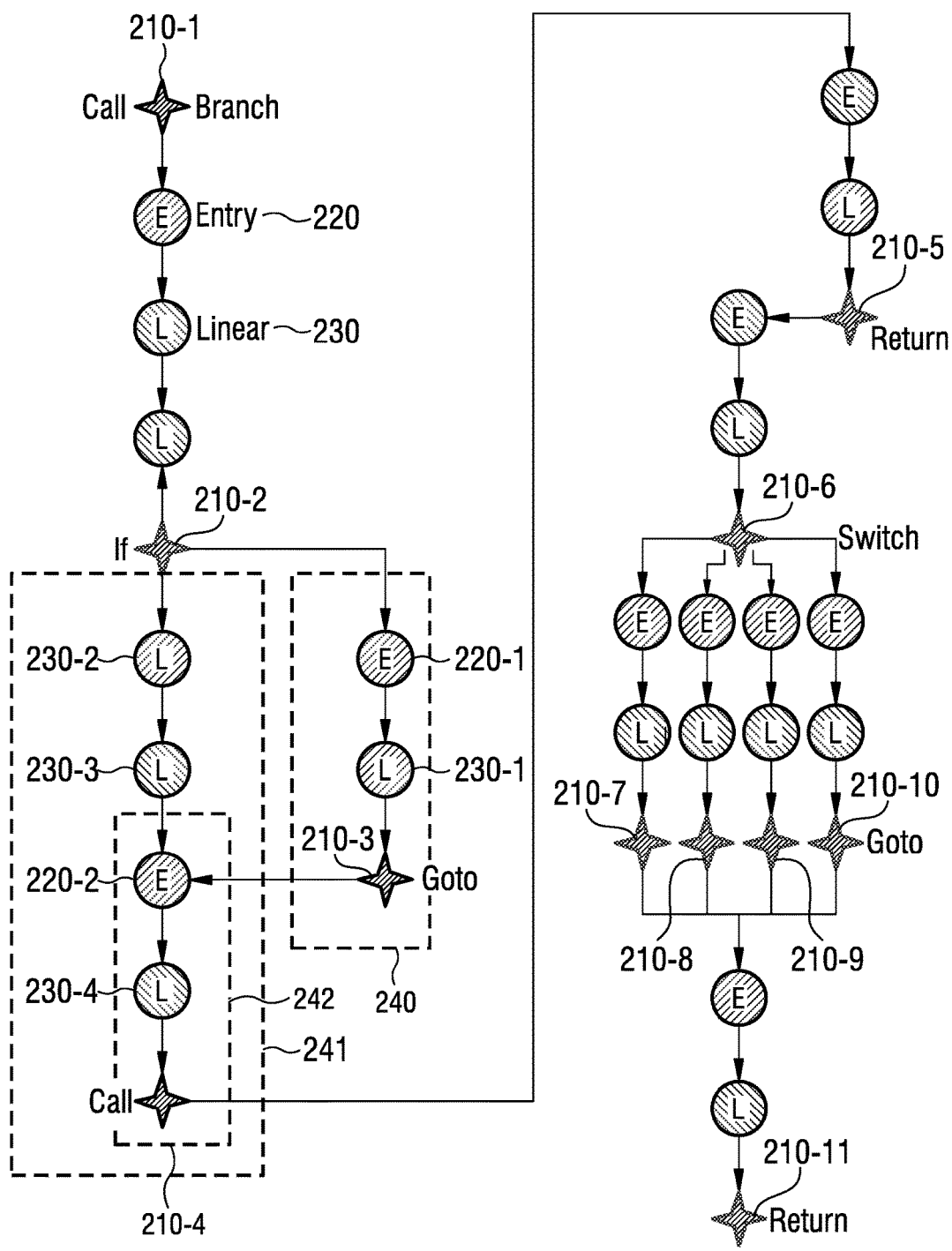
FIG. 2a illustrates a program flow of a code fragment.

Various example embodiments will now be described more fully with reference to the accompanying drawings in which some example embodiments are illustrated. In the figures, the thicknesses of lines, layers and/or regions may be exaggerated for clarity.

Accordingly, while further embodiments are capable of various modifications and alternative forms, some example embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of further example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art, unless expressly defined otherwise herein.

FIG. 1 illustrates a method 100 for determining an integrity of an execution of a code fragment. The code fragment is part of a program code. For example, the code fragment is a sequence of instructions. The program code (i.e. the code fragment) may, e.g, be provided in a machine language (i.e. as a set of instructions that is executed directly by a processing unit) or an interpreted language (i.e. as a set of instructions that are executed directly without previously compiling it into a machine language). In some embodiments, the program code may be a bytecode for a virtual machine (e.g. a bytecode for a Java Card based virtual machine).

The integrity of the execution of the code fragment indicates that intended (i.e. correct) instructions within the code fragment are executed in an intended (i.e. correct) sequence. Moreover, the integrity of the execution of the code fragment indicates that only intended (i.e. correct or valid) paths between different code fragments of the program code are executed. In other words, the integrity indicates that an actual program flow of the executed program code is identical to an intended program flow of the program code.

The method 100 comprises identifying 102 a reference signature for the code fragment within an abstracted representation of the program code comprising the code fragment. The abstracted representation of the program code is a representation that represents the program flow of the program code. However, the abstracted representation is reduced in complexity compared to the program code. For example, a code sequence or a code fragment of the program code may represented by a single entity in the abstracted representation.

In some embodiments, the code fragment may be a basic block of the program code. A basic block is a sequence of instructions that is (can be) entered only at the first instruction of the sequence of instructions and that can be exited only from the last instruction of the sequence of instructions. That is, a basic block has one entry point and one exit point, so that no code within the basic block is a destination of a jump instruction within the program code and that only the last instruction of the basic block can cause the program to begin executing code in another different basic block. Accordingly, an entity in the abstracted representation may, e.g., represent a basic block of the program code.

The reference signature is an indicator that indicates a correct execution of the code fragment. That is, the reference signature indicates that a sequence of intended (i.e. correct) instructions within the code fragment is executed in an intended (i.e. correct) order. If the code fragment comprises a plurality of basic blocks, the reference signature may further indicate that only intended (i.e. valid) paths between the basic blocks were executed (taken). For example, the reference signature may be a value or a bit string. The reference signature for the code fragment may be determined (calculated) in the course of generating the abstracted representation. For example, a check value for a cyclic redundancy check (CRC) or a hash value may be determined based on the code of the code fragment under observation. For example, a reference signature for each basic block may be determined depending on the sequence of instructions comprised by the respective basic block.

The method 100 further comprises executing 104 the code fragment. For example, if the code fragment is a bytecode, the code fragment may be executed by a virtual machine. In some embodiments, executing the code fragment may comprise interpreting the code fragment using an interpreter.

Determining 106 a signature of the executed code fragment is further comprised by the method 100. The signature is an indicator that characterizes the actual execution of the code fragment. That is, the signature of the executed code fragment characterizes the sequence of actually executed instructions. If the code fragment comprises a plurality of basic blocks, the reference signature may further characterize actually executed (taken) paths between the basic blocks. In other words, the signature may be computed in parallel to the execution of the code, so that it is based on the code actually executed. For example, the signature may be a numeric value or a bit string.

The signature may be determined similar to the reference signature (e.g. using the same mathematical concept or algorithm).

The execution of the code fragment may be manipulated by malicious attackers, so that code other than originally generated is executed so that a result of the execution may become corrupt or false. To this end, an individual instruction may be altered. Another possibility would be to change an order of the execution of individual instructions. For example, a defined amount of energy may be applied to a semiconductor circuit executing the code fragment to cause a bit flip during the execution of the code fragment. A bit flip may cause that an incorrect instruction is executed instead of an intended instruction. Further, a bit flip may cause that an order of execution of instructions within the code fragment is changed. Accordingly, the result of the execution may become corrupt or false.

The execution of the code fragment may further be distorted due to environmental influences (e.g. temperature, radiation). For example, in safety-critical applications like automotive applications (e.g. a car), railway (e.g. a train) or aviation (e.g. an airplane), correct execution of program code is mandatory for safety (e.g. of passengers). Therefore, any integrity violation of an executed code fragment should be detected immediately.

In order to detect such inconsistencies, the method 100 comprises comparing 108 the signature with the reference signature. For example, comparing the signature of the executed program code to the reference signature may comprise validating that the signature and the reference signature are identical. Comparing the signature and the reference signature may allow to detect whether the actual execution of the code fragment differs from the intended (correct) execution of the code fragment. That is, the order of actually executed instructions is identical to an intended (i.e. correct) order of intended (i.e. correct) instructions within the code fragment. If the code fragment comprises a plurality of basic blocks, the comparison of the signature with the reference signature may further indicate that only intended (i.e. valid) paths between the basic blocks were executed (taken).

Using the abstracted representation of the code may further allow to minimize required resources for the integrity determination, since interpreting the abstracted representation may require, e.g., less memory space or processing power than executing a further instance of the program code in parallel. For example, the execution of a program code without any inherent protective mechanism against integrity attacks may be protected against integrity attacks by the proposed method, since the integrity attack is detected by comparing a reference signature for the executed code fragment with a reference signature from the abstracted representation of the program code. Accordingly, the method may provide an embedment for any program code against integrity attacks on the code and the data. Moreover, the method may allow to detect distorted execution of the code fragment due to environmental influences.

In some embodiments, the method may further comprise executing an alarm routine, if the signature is different from the reference signature. For example, the alarm routine may provide an alarm notification to a user or a responsible person. Alternatively or additionally, the alarm routine may stop an execution of further parts of the program code or may prohibit execution of further parts of the code. For example, if the program code is stored on a chip card (e.g. an access card), the alarm routine may activate a program code to set a state of the chip card to a disabled state (i.e. render the chip card unusable).

In some embodiments, the alarm routine may cause a deletion of data from a memory and/or a register. For example, the alarm routine may cause a deletion of sensitive or endangered data (e.g. a security key or a password) stored in the memory or the register. In some embodiments, the memory or the register may be different from a memory or a register to which the program code for executing the method is stored. By deleting data in case of an alarm condition, access to the data by potentially malicious attackers may be prevented. Accordingly, sensitive data may be prevented from unauthorized access. For example, if the data is stored on a chip card (e.g. an access card), deleting the data may render the chip card unusable, so that fraudulent use of the chip card may be prevented.

In some embodiments, identifying 102 the reference signature may be carried out independently from executing 104 the code fragment and determining 106 the signature of the executed code fragment. Identifying 102 the reference signature may be carried out such that the actual execution of the code fragment does not influence the identification of the reference signature. For example, different memory locations may be used for identifying the reference signature within the abstracted representation and for executing the code fragment and determining its signature. Alternatively or additionally, the identification of the reference signature and the execution of the code fragment may be carried out by separate processes. In some embodiments, the identification of the reference signature and the execution of the code fragment may be carried out in parallel, i.e., substantially at a same time instant. Carrying out the above steps independently from each other may allow to further enhance security, since a manipulation of one of the execution of the code fragment and the abstracted representation of the program code does not influence the other.

In some embodiments, the abstracted representation comprises a linked list comprising a plurality of nodes. The linked list is a data structure representing the flow of the program code by the plurality of nodes. At least one node of the plurality of nodes may be related to the code fragment (e.g. being a basic block). The remaining nodes may be related to other code fragments of the program code (e.g. other basic blocks).

The at least one node of the plurality of nodes may comprise a reference signature for the basic block (if the code fragment corresponds to a basic block). The entry point (i.e. the first instruction) of the basic block may, e.g., be a function entry or a destination address of a branching-instruction. The branching instruction may be any instruction that may cause an entity (e.g. a processor or a virtual machine) executing the basic block to begin execution of a different instruction sequence (e.g. a different basic block or another code fragment). For example, the branching instruction may be an IF-instruction, a GOTO-instruction, or an INVOKE-instruction. In some embodiments, the branching instruction may be the first branching instruction in the sequence of instructions.

Basing the linked list on basic blocks of the program code may be a simple construct for abstracting the program code while maintaining the program flow of the program code. Moreover, using basic blocks for integrity determination may allow to ensure that the signature is unambiguous since it does not depend on the code flow. For example, the at least one node may further comprise at least one reference to another node of the plurality of nodes, wherein the other node is related to a further basic block. The further basic block may be the next sequence of instructions to be executed within the program code (e.g. the further basic block begins with a destination address of a branching instruction ending the current basic block). Accordingly, the program code may be represented by a plurality of interconnected nodes, wherein each node is associated with the reference signature of the basic block it represents. By storing the basic blocks and their associated reference signatures as linked list, an executing system can identify the reference signature for an executed code fragment by interpreting the linked list (eventually even in the event of multiple references within a basic block). Moreover, since the linked list is a compressed representation of the program code, a footprint, i.e., a required memory space, may be comparative small.

Although basic blocks of the program code were described as examples for code fragments, the integrity may be determined for any kind of code fragment, i.e., also for code fragments different from basic blocks of the program code.

More details and aspects are mentioned in connection with the embodiments described below. The embodiment illustrated in FIG. 1 may comprise one or more additional optional features corresponding to one or more aspects of the proposed concept or one or more embodiments described below.

FIG. 2a illustrates a program flow graph 200 of a fragment of a program code (e.g. a Java applet). The program flow graph 200 represents a relation between single instructions or sequences of instructions comprised by the code fragment. Each node of the program flow graph represents a single instruction or a sequence of instructions within the code fragment. The program flow graph 200 comprises a plurality of branching nodes 210-1, . . . , 210-11 relating to branching instructions (e.g. a GOTO-instruction, a RETURN-instruction, or a SWITCH-instruction). The program flow graph 200 further comprises entry nodes 220 relating to instructions to which branching instructions (represented by the branching nodes 210-1, . . . , 210-11) are jumping. Moreover, the program flow graph 200 comprises linear nodes 230 relating to one or more instructions that are executed in linear sequence (e.g. an instruction to increment a variable).

One or more nodes of the program flow graph 200 may belong to a basic block comprised by the code fragment. For example, a first basic block 240 contains the entry node 220-1 and the linear node 230-1 between the branching nodes 210-2 and 210-3. The first basic block 240 ends with the branching node 210-3. That is, the first basic block 240 comprises a sequence of instructions, wherein the basic block 240 can be entered only at the first instruction (entry node 220-1) of the sequence of instructions and can be exited only from the last instruction (branching node 210-3) of the sequence of instructions. Accordingly, the program flow of the code fragment illustrated in FIG. 2a may be illustrated by way of a control flow graph describing relations between the various basic blocks of the code fragment (e.g. see FIG. 2b).

Further, extended basic blocks may be comprised by the code fragment illustrated in FIG. 2a. An extended basic block is a basic block than contains another basic block. That is, the extended basic block may be entered not only at the first instruction of the sequence of instructions, but also at an instruction within the sequence of instructions.

For example, an extended basic block 241 contains the linear nodes 230-2, 230-3, 230-4 and the entry node 220-2 between the branching nodes 210-2 and 210-4. The extended basic block 241 ends with the branching node 210-4. A second (regular) basic block 242 contains the linear node 230-4 and the entry node 220-2 between the branching nodes 210-3 and 210-4. The second basic block 242 ends with the branching node 210-4. That is, the second basic block 242 is comprised by the extended basic block 241.

In other words, FIG. 2a may illustrate an example of a graph representation of a Java applet. The graph may contain three types of nodes: a) Branch (instructions with one, two or more jump destinations); b) Entry (instructions to which branches are jumping); and c) Linear (simple instructions which are executed in linear sequence).

Figure 2B:
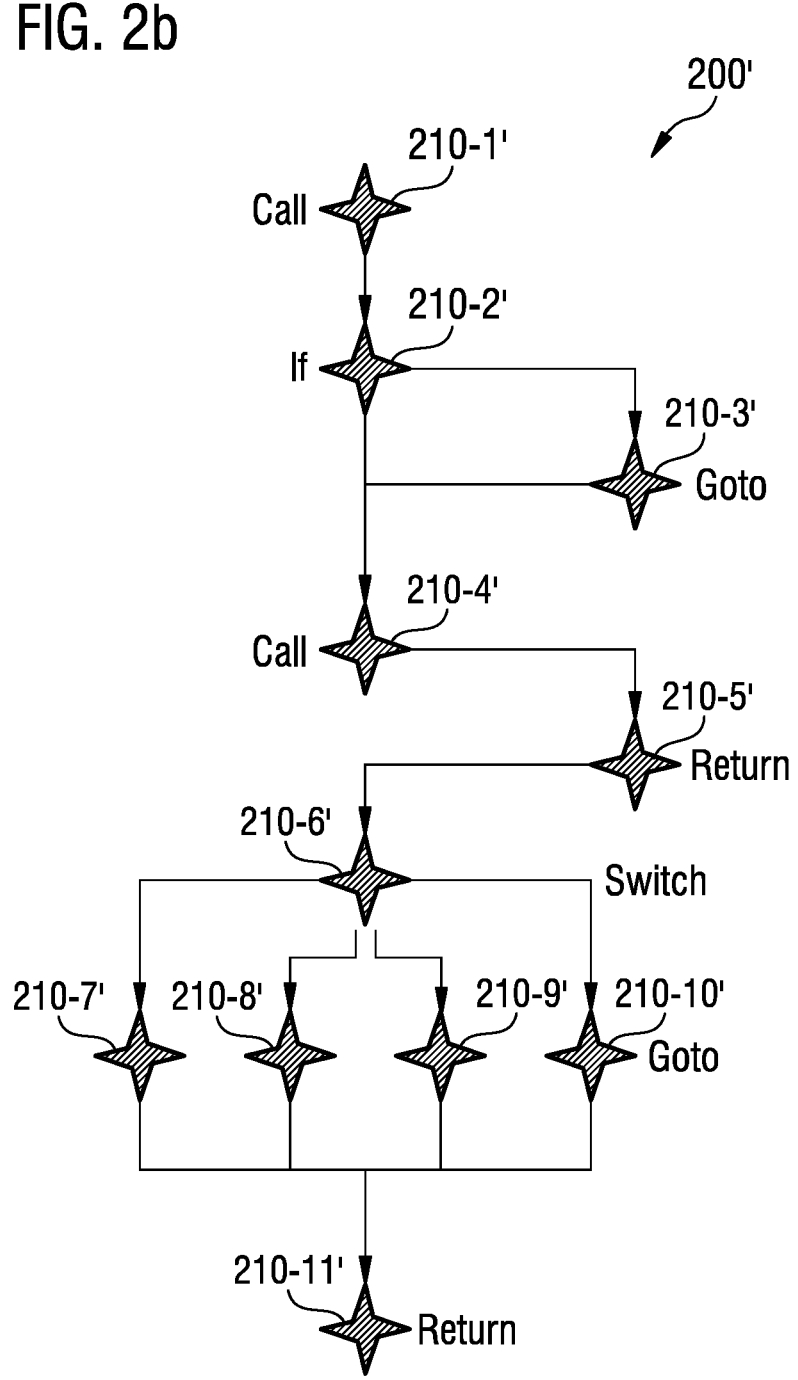
FIG. 2b illustrates a control flow graph of the code fragment.

FIG. 2b illustrates a control flow graph 200' of the fragment of the program code illustrated in FIG. 2a. The flow control graph 200' contains nodes 210-1', . . . , 210-11' which correspond to basic blocks of the code fragment illustrated in FIG. 2a. The nodes 210-1', . . . , 210-11' are illustrated as branching nodes in FIG. 2b, wherein each node 210-1', . . . , 210-11' represents a basic block that ends with a corresponding branching node 210-1, . . . , 210-11 in the program flow graph 200 illustrated in FIG. 2a. Each node 210-1', . . . , 210-11' is provided with a reference signature for the basic block that ends with the respective branching node. For example, the node 210-3' comprises a reference signature for the first basic block 240 since the first basic block 240 ends with the corresponding branching node 210-3 in the program flow graph illustrated in FIG. 2a.

The control flow graph 200' may be considered as an abstracted representation of the fragment of the program code, since the representation of the actual program code is reduced to its basic blocks.

In other words, an abstracted and compressed representation may be built by reducing the original graph by the linear instructions (e.g. linear bytecode) and the entry points, so that only a graph of the branches remains.

The integrity of an execution of a basic block of the code fragment illustrated by the program flow graph 200 in FIG. 2a may be determined by comparing the program flow graph 200 to the abstract control flow graph 200' as illustrated in FIG. 3. The program flow graph 200 is compared to the control flow graph 200' at the branching nodes, i.e., at the last instruction of the respective basic block. For example, for the basic block 240, a signature is determined during execution of the program code. When the branching node 210-3 is executed, the signature is compared to a reference signature of the corresponding node 210-3' of the abstract program flow graph 200'. For example, the reference signature may be determined (calculated) during the generation of the program flow graph 200'.

By comparing the determined signature for the actual execution of the sequence of instructions represented by the basic block 240 to the reference signature, an integrity of the execution is determined. That is, it is determined whether intended (i.e. correct) instructions within the code fragment were executed in an intended (i.e. correct) order. If the signature is different from the reference signature, an integrity attack may be assumed. Accordingly, an alarm routine may be executed. For example, an alarm notification may be transmitted, data may be deleted from a memory, or the execution of the program code may be stopped. By comparing the execution of the program code to the abstracted representation at the branching instructions (i.e. comparing the representations simultaneously to the execution of the program code), an integrity of the execution may be determined right after the execution of a basic block (i.e. after execution of only a fragment of the whole program code). Hence, an integrity violation may be determined in real-time, so that a further erroneous execution of the program code may be prevented. Moreover, countermeasures may be started immediately after the erroneous execution of the basic block.

The embodiment illustrated in FIG. 3 may comprise one or more additional optional features corresponding to one or more aspects of the proposed concept or one or more embodiments described above or below.

Figure 4:
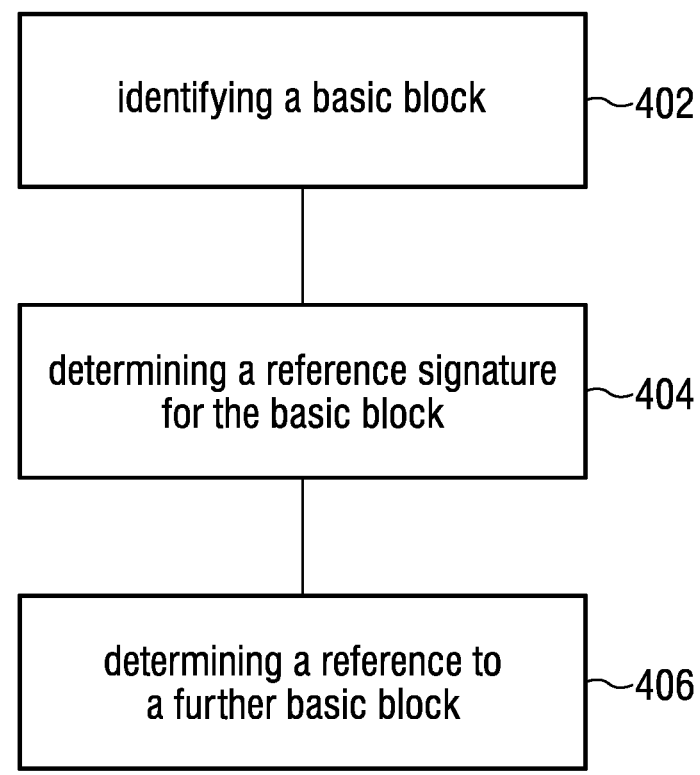
FIG. 4 illustrates a method for providing an abstracted representation of a program code.

A method 400 for providing (generating) an abstracted representation of a program code (e.g. illustrated in FIG. 2b or FIG. 3) is illustrated in FIG. 4. The program code may be provided in a machine language or an interpreted language (e.g. as bytecode).

The method 400 comprises identifying 402 a basic block within the program code. The basic block is a sequence of instructions that is (can be) entered only at the first instruction of the sequence of instructions and that can be exited only from the last instruction of the sequence of instructions. For example, a first instruction of a code sequence following a branching instruction within the program code may be the entry point of the basic block. The basic block may, e.g., end at a subsequent branching instruction. That is, the last instruction of the sequence of instructions may be a branching instruction.

Further, the method 400 comprises determining 404 a reference signature for the basic block. The reference signature is an indicator that indicates a correct execution of the code fragment (code sequence) represented by the basic block. That is, the reference signature indicates that a sequence of intended (i.e. correct) instructions within the basic block is executed in an intended (i.e. correct) order. For example, the reference signature may be a numeric value or a bit string (e.g. a check value for a CRC or a hash value).

The method further comprises determining 406 a reference to a further basic block. The further basic block is the next sequence of instructions to be executed within the program code. The reference to the further basic block may allow to represent a program flow of the program code within the abstracted representation.

The generated abstracted representation is reduced compared to the program code since fragments of the program code (code fragments) are represented by basic blocks. The basic blocks are associated with their respective reference signature, so that a comparison of the reference signature with a calculated signature for an execution of the code fragment represented by the basic block may be possible.

In some embodiments, the method 400 may further comprise adding information on the basic block (e.g. for identifying the basic block, or the number of instructions comprised by the basic block) and its associated reference signature to a node of a list. Storing the information on the basic block and its associated reference signature to a node of the list allows to provide a list as abstracted representation. The list may allow to represent the program flow of the program code. For example, the list may be a linked list, so that the reference to the further basic block may be translated into a reference to a further node. By storing information on the basic block and its associated reference signature as a list, an executing system (e.g. a processor or a virtual machine) may identify the reference signature for an executed code fragment by reading the list.

Moreover, since the list is a compressed representation of the program flow, a footprint, i.e. a required memory space, may be comparative small.

The method 400 may further comprise storing the list (i.e. the abstracted representation) and the program code. For example, the abstracted representation may be stored together with the program code (e.g. in a same memory). In some embodiments, the abstracted representation and the program code may be stored in a memory of a chip card.

The method for generating the abstracted representation of the program code may, e.g., be carried out on a target system (e.g. by an integrated circuit of a chip card). Accordingly, the abstracted representation may be generated without any external means. Therefore, the target system may allow to provide an abstracted representation of a program code (e.g. an applet) for an integrity check of an execution of the program code on the target system. Conventional external devices (e.g. a conventional card reader) for communication with the target system may be used, since the generation of the abstracted representation is carried out on the target system (as well as the integrity determination). For example, the generation of the abstracted representation may be carried out in the course of an initialization of the program represented by the program code.

In some embodiments, the method for generating the abstracted representation of the program code may be carried out by an external device (e.g. a card reader, a processing unit connected to the card reader, or a system that has generated the program code). Accordingly, a performance requirement for the target system may be reduced, since the generation is performed by the external means (e.g. having an increased processing power compared to the target system). Moreover, generating the abstracted representation by the system that has generated the program code may allow to generate the abstracted representation only once, since the centrally generated abstracted representation may be provided to any target system or external device communicating with the target system.

More details and aspects are mentioned in connection with the embodiments described above or below. The embodiment illustrated in FIG. 4 may comprise one or more additional optional features corresponding to one or more aspects of the proposed concept or one or more embodiments described above or below.

The methods according to one or more aspects of the proposed concept or one or more embodiments described herein may be performed by a program execution engine. In some embodiments, the program execution engine may be implemented as hardware (e.g. an integrated circuit or a processor). In some embodiments, the program execution engine may be implemented as software (e.g. an interpreter, or a virtual machine). For example, the program execution engine may comprise an interpreter for a bytecode. In some embodiments, the bytecode may be based on JAVA. For example, the program execution engine may be a Java Card virtual machine and the program code may be a Java Card bytecode.

Figure 5:
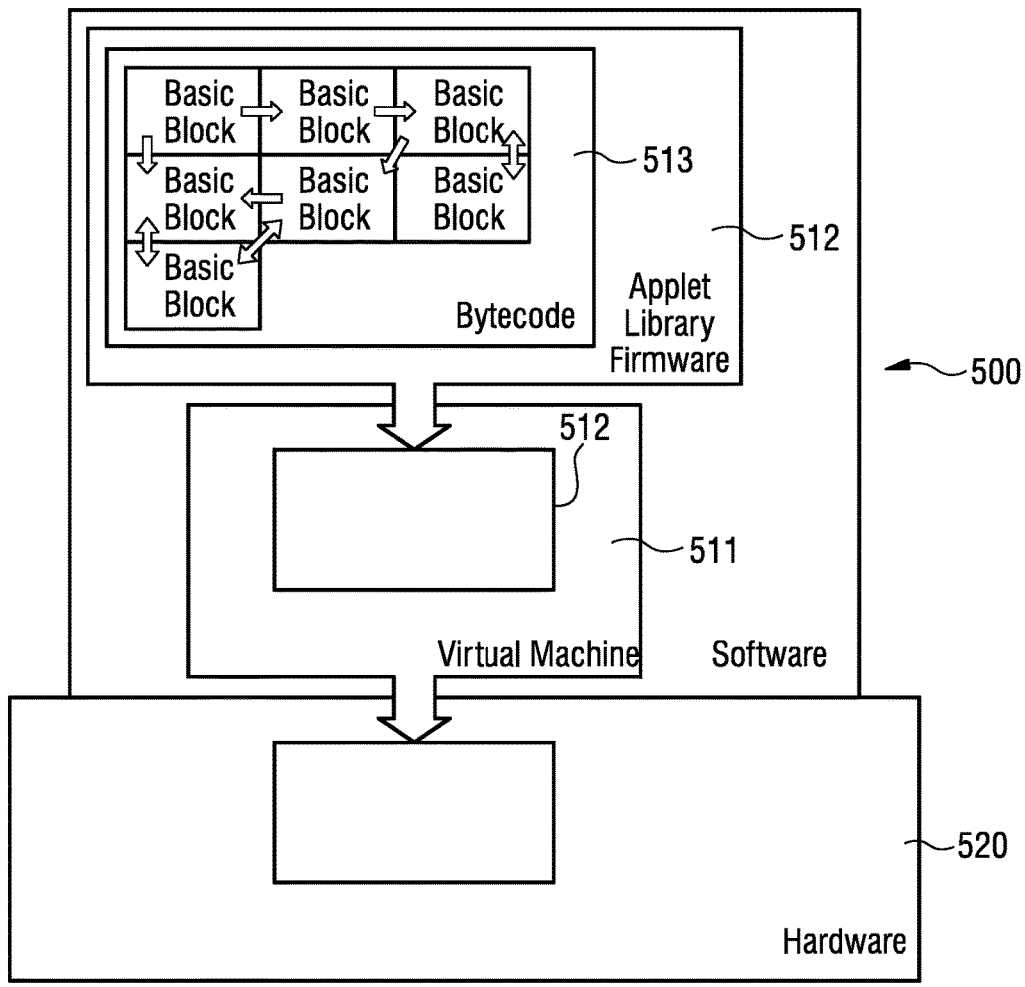
FIG. 5 illustrates an embedment of a program execution engine for performing the method for determining an integrity of an execution of a code fragment and/or the method for providing an abstracted representation of a program code in a computing system.

An example embodiment of an embedment of a program execution engine 500 in a computing system is illustrated in FIG. 5. A software environment 510 is executed on a hardware 520 (e.g. a processor). The software environment 510 comprises a virtual machine 511 (e.g. a Java Card virtual machine). Within the virtual machine 511, a computer program 512 having a program code for performing methods according to one or more aspects of the proposed concept or one or more embodiments described herein is implemented. A bytecode 513 is protected by the computer program 512. For example, the computer program 512 may generate an abstracted representation of the bytecode 513. The abstracted representation may be used to determine the integrity of an execution of (fragments of) the bytecode 513 on the virtual machine. That is, the computer program 512 provides a protection layer for the bytecode 513 within the virtual machine 512. Further security measure may be taken on the hardware layer.

In other words, the signature checking method may be embedded into a layered security architecture: a) hardware layer; b) interpreter layer (Adherent Instruction Set Signature); and c) application/library/firmware layer (the interpreted bytecode of the runtime system).

More details and aspects are mentioned in connection with the embodiments described above or below. The embodiment illustrated in FIG. 5 may comprise one or more additional optional features corresponding to one or more aspects of the proposed concept or one or more embodiments described above or below (e.g. FIG. 1 or FIG. 4).

An example embodiment using integrity determination of an execution of a code fragment or provision of an abstracted representation of a program code according to one or more aspects of the proposed concept or one or more examples described above is illustrated in FIG. 6.

Figure 6:
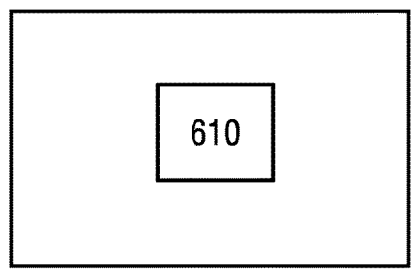
FIG. 6 schematically illustrates a chip card.

FIG. 6 illustrates a chip card 600. The chip card 600 comprises a program execution engine 610 (e.g. a processor or a virtual machine) according to examples described herein. The program execution engine is configured to perform methods according to one or more aspects of the proposed concept or one or more embodiments described herein.

The chip card 600 may allow to detect an integrity attack on the card. Furthermore, the chip card 600 may allow to provide an abstracted representation of a program code for the integrity determination of the program code. Accordingly, the chip card 600 may provide a high security level.

Example embodiments may further provide a computer program having a program code for performing one of the above methods, when the computer program is executed on a computer or processor. A person of skill in the art would readily recognize that steps of various above-described methods may be performed by programmed computers. Herein, some example embodiments are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further example embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A method for determining an integrity of an execution of a code fragment, comprising:
   identifying a reference signature for the code fragment within an abstracted representation of a program code comprising the code fragment;
   executing the code fragment;
   determining a signature of the executed code fragment;
   comparing the signature with the reference signature; and
   executing, based on the comparison of the signature and the reference signature, an alarm routine that includes causing a deletion of data from a memory and/or a register.

2. The method of claim 1, wherein identifying the reference signature is carried out independently from executing the code fragment and determining the signature of the executed code fragment.

3. The method of claim 1, wherein the alarm routine is executed if the signature is different from the reference signature.

4. The method of claim 1, wherein the code fragment comprises a basic block of the program code, a basic block being a sequence of instructions that is entered only at the first instruction of the sequence of instructions and that can be exited only from the last instruction of the sequence of instructions.

5. The method of claim 1, wherein the abstracted representation comprises a linked list comprising a plurality of nodes, wherein at least one node of the plurality of nodes is related to the code fragment.

6. The method of claim 4, wherein the last instruction of the sequence of instructions is a branching instruction.

7. The method of claim 5, wherein the code fragment comprises a basic block of the program code, a basic block being a sequence of instructions that is entered only at the first instruction of the sequence of instructions and that can be exited only from the last instruction of the sequence of instructions.

8. The method of claim 7, wherein the at least one node of the plurality of nodes comprises a reference signature for the basic block.

9. The method of claim 5, wherein the at least one node further comprises at least one reference to another node of the plurality of nodes, the other node being related to a further basic block, the further basic block being the next sequence of instructions to be executed within the program code.

10. The method of claim 7, wherein the last instruction of the sequence of instructions is a branching instruction.

11. The method of claim 1, wherein the code fragment is a fragment of a bytecode.

12. A program execution engine comprising:
a memory; and
a processor that is configured to perform the method of claim 1.

13. The program execution engine of claim 12, wherein the program execution engine further comprises an interpreter for a bytecode.

14. The program execution engine of claim 13, wherein the bytecode is based on Java.

15. A chip card comprising the program execution engine according to claim 12.

16. A method for providing an abstracted representation of a program code, comprising:
identifying a basic block within the program code, wherein the basic block is a sequence of instructions that is entered only at the first instruction of the sequence of instructions and that can be exited only from the last instruction of the sequence of instructions;
determining a reference signature for the basic block;
verifying the basic block based on the reference signature;
executing, based on the verification, an alarm routine that includes causing a deletion of data from a memory and/or a register; and
determining a reference to a further basic block, the further basic block being the next sequence of instructions to be executed within the program code.

17. The method of claim 16, further comprising:
adding information on the basic block and its associated reference signature to a node of a list; and
storing the list and the program code.

18. The method of claim 16, wherein the last instruction of the sequence of instructions is a branching instruction.

19. The method of claim 16, wherein the program code is a bytecode.

20. The method of claim 16, wherein the alarm routine is executed if the verification fails.

21. A method for determining an integrity of an execution of a code fragment, comprising:
identifying a reference signature for the code fragment within an abstracted representation of a program code including the code fragment, the abstracted representation including a linked list having a plurality of nodes, wherein at least one node of the plurality of nodes is related to the code fragment;
executing the code fragment;
determining a signature of the executed code fragment; and
comparing the signature with the reference signature.

22. The method of claim 21, wherein the linked list is a data structure corresponding to a flow of the program code by the plurality of nodes.

23. The method of claim 21, wherein the linked list comprises a plurality of reference signatures and respective associations with a plurality of code fragments of the program code, wherein the plurality of reference signatures includes the reference signature and the plurality of code fragments includes the code fragment.

* * * * *